(12) United States Patent
Mehendale et al.

(10) Patent No.: US 8,032,931 B2
(45) Date of Patent: Oct. 4, 2011

(54) FABRIC MANAGER MULTIPLE DEVICE LOGIN

(75) Inventors: Nitin Mehendale, San Jose, CA (US); Shannon Kohl, San Mateo, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1725 days.

(21) Appl. No.: 10/283,662

(22) Filed: Oct. 30, 2002

(65) Prior Publication Data

US 2004/0088572 A1 May 6, 2004

(51) Int. Cl.
*G06F 7/04* (2006.01)
(52) U.S. Cl. .............................................. 726/8; 726/10
(58) Field of Classification Search ................ 726/8, 10
See application file for complete search history.

(56) References Cited

U.S. PATENT DOCUMENTS

| | | | |
|---|---|---|---|
| 5,426,421 A * | 6/1995 | Gray | 709/223 |
| 5,655,077 A * | 8/1997 | Jones et al. | 726/8 |
| 5,689,638 A * | 11/1997 | Sadovsky | 726/21 |
| 5,832,503 A * | 11/1998 | Malik et al. | 709/223 |
| 6,006,334 A * | 12/1999 | Nguyen et al. | 726/5 |
| 6,219,708 B1 * | 4/2001 | Martenson | 709/226 |
| 6,629,246 B1 * | 9/2003 | Gadi | 726/8 |
| 6,654,796 B1 * | 11/2003 | Slater et al. | 709/220 |
| 6,715,082 B1 * | 3/2004 | Chang et al. | 726/8 |
| 6,826,692 B1 * | 11/2004 | White | 726/8 |
| 6,845,451 B1 * | 1/2005 | Anand et al. | 726/5 |
| 6,973,671 B1 * | 12/2005 | Hsing et al. | 726/8 |
| 7,150,038 B1 * | 12/2006 | Samar | 726/8 |
| 7,487,535 B1 * | 2/2009 | Isaacson et al. | 726/4 |
| 2003/0131096 A1 * | 7/2003 | Goringe et al. | 709/224 |

* cited by examiner

*Primary Examiner* — Kambiz Zand
*Assistant Examiner* — Amare F Tabor
(74) *Attorney, Agent, or Firm* — Conley Rose, P.C.

(57) ABSTRACT

A user (e.g., a network administrator) can enter user verification information once for each switch on which the user desires to perform an administrative activity (e.g., ROM flash, reboot, etc.). Rather than having to enter the user verification information each time a switch is accessed for an administrative activity, the verification information is entered once and stored in non-volatile memory for subsequent use when accessing the switch.

18 Claims, 5 Drawing Sheets

FABRIC MANAGER MULTIPLE DEVICE LOGIN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer networks. More particularly, the invention relates to an efficient technique for logging on to multiple switches in a fabric. Still more particularly, the invention relates to a control console which prevents a user from having to enter log in information for a switch in a fabric more than once, despite desiring to access the switch more than once.

2. Background Information

Initially, computers were most typically used in a standalone manner. It is now commonplace for computers and other types of computer-related and electronic devices to communicate with each other over a network. The ability for computers to communicate with one another has lead to the creation of networks ranging from small networks comprising two or three computers to vast networks comprising hundreds or even thousands of computers. Networks can be set up to provide a wide assortment of capabilities. For example, networks of computers may permit each computer to share a centralized mass storage device or printer. Further, networks enable electronic mail and numerous other types of services. Generally, a network's infrastructure comprises switches, routers, hubs and the like to coordinate the effective and efficient transfer of data and commands from one point on the network to another.

Networks often comprise a "fabric" of interconnected switches which are devices that route data packets from a source port to a destination port. The switches in a network are relatively complex devices that include processors, memory, and related components and execute firmware stored in non-volatile memory which may comprise read only memory ("ROM"). The switches typically have multiple ports which may be physically connected to other switches or other devices such as consoles, storage devices and other types of I/O devices. Via one or more consoles connected to the switches, a network administrator can monitor the status of any of the switches in the fabric, configure any switch, flash the switch's ROM and generally perform any of a variety of desired administrative activities.

For sake of security, each administrative task with respect to a switch typically requires the administrator to enter user verification information, such as a User ID and Password, to reduce the risk of an unauthorized entity gaining administrative access to the fabric. Although not terribly cumbersome with a relatively few switches in the fabric, the action of manually entering a User ID and Password via a keyboard coupled to the console for each switch to be accessed for an administrative action can be very cumbersome and time consuming in a fabric having a large number of switches. Further, at least in some fabric implementations, the administrator's User ID and Password must be entered each time a switch is accessed even if the same switch is accessed more than once to perform an administrative action. For example, the administrator may desire to flash a switch's ROM. Then, the administrator may desire to reconfigure one of the switch's ports. For each of these actions, the administrator will be inconvenienced by having to enter a User ID and Password. As noted above, this inconvenience is exacerbated as the number of switches in the fabric grows. Accordingly, a solution to this problem is needed.

BRIEF SUMMARY OF THE PREFERRED EMBODIMENTS OF THE INVENTION

The preferred embodiments of the present invention solve the problems noted above by permitting a user (e.g., a network administrator) to enter user verification information once for each switch on which the user desires to perform an administrative activity (e.g., ROM flash, reboot, etc.). Rather than having to enter the user verification information each time a switch is accessed for an administrative activity, the verification information preferably is entered once and stored in non-volatile memory for subsequent use when accessing the switch. The verification information may include a user identification, password, biometric data pertaining to the user, and/or other types of user-identifying information.

In accordance with a preferred embodiment of the invention, a network comprising a plurality of switches coupled together includes an interactive console on which the user operates to access switches for various administrative activities. The console preferably comprises a computer on which an application runs that performs much of the functionality described herein. The application permits a user the ability to select a switch, enter user verification information for the selected switch, have the verification information stored in a volatile memory buffer in the console, retrieve the user verification information from the memory buffer, and use the user verification information to access the switch. Once a entered or saved in the volatile memory buffer, the verification information is retrieved from the memory buffer each time the switch is selected to perform an administrative activity, rather than forcing the user to re-enter the verification information, as was the case for conventional systems.

In accordance with another embodiment, a graphical image (e.g., an icon) is shown on the console's display. The graphical image is shown adjacent an identification of a switch to indicate that the user has already entered and caused to be stored the user verification information for the associated switch. In accordance with yet another aspect of the invention, the console automatically determines whether the user has previously entered verification information for a selected switch. If no verification information has previously been entered, the console automatically prompts the user for the needed verification information or asks the user whether the user wishes to enter such verification information.

These and other aspects and benefits of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect physical connection. Thus, if a first device couples to a second device, that connection may be through a direct physical connection, or through an indirect physical connection via other devices and connections.

The terms "administrator" and "network administrator" are used throughout this disclosure. Such persons may perform the actions described herein. However, the actions described herein can be performed by any user, not just network administrators. The following description often uses the terms "administrator" and "network administrator" for ease in understanding. Many, or all, of the claims which follow use the term "user" to indicate that any person can perform the stated functions and actions. An "administrative task" or "administrative activity" on a switch is any action that requires a user to enter user verification information for the switch.

To the extent that any term is not specially defined in this specification, the intent is that the term is to be given its plain and ordinary meaning.

DETAILED DESCRIPTION OF THE PREFERRED EMBODIMENTS

Figure 1:
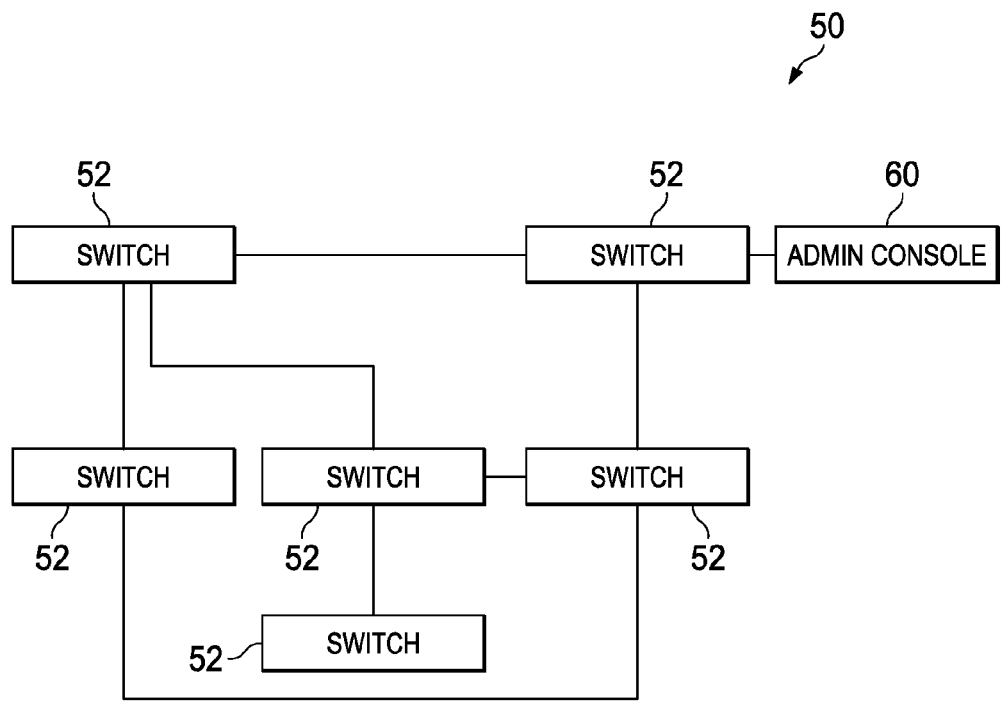
FIG. 1 shows a switch fabric comprising a plurality of switches and an administrator console in accordance with a preferred embodiment of the invention.

Referring now to FIG. 1, a switch fabric 50 is shown configured in accordance with a preferred embodiment of the invention. The fabric 50 includes six switches 52 coupled together as desired by the system designers. FIG. 1 shows one possible way to connect the switches 52, but numerous other configurations are possible as well. Further, more or less than the number of switches 52 shown in FIG. 1 can be included in fabric 50.

FIG. 1 also shows an administrator console 60 coupled to one of the switches 52. More than one administrator console 60 can be included in the fabric and connected to the same or different switch 52 as desired. Via the administrator console, a network administrator can access any switch 52 in the fabric 50 to perform one or more administrator activities. Such activities include, without limitation, flashing a switch's ROMs (not specifically shown) with new firmware, rebooting a switch, reconfiguring a switches' ports, and other activities.

Figure 2:
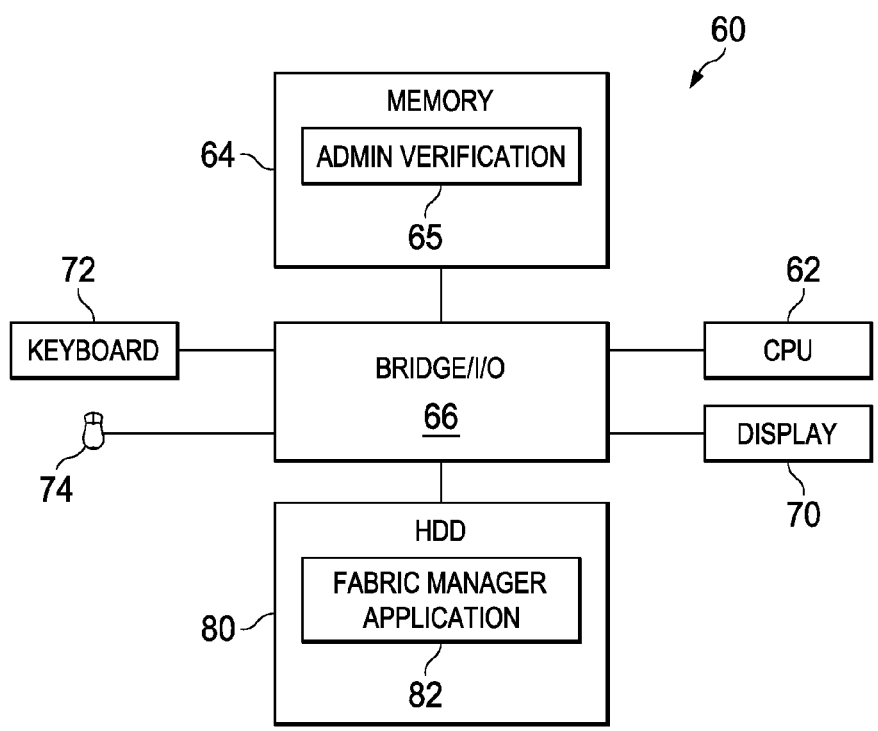
FIG. 2 shows a preferred block diagram of the administrator console including memory allocated for storing administrator verification data.

FIG. 2 shows one exemplary embodiment of an administrator console 60. As shown, the console includes a central processing unit ("CPU") 62, memory 64, a display 70, input devices 72 and 74 and a hard disk drive 80 coupled to a bridge and I/O unit 66. Other configurations of the administrator console 60 are acceptable as well. Preferably, the console 60 comprises a desktop or notebook computer or a workstation. The input devices 72, 74 include a keyboard and a mouse. The bridge and I/O unit 66 includes logic which operatively intercouples the other devices shown in the console.

The hard disk drive 80 preferably contains a fabric manager application 82 which can be run by CPU 62. When selected to be run by the administrator, the fabric manager 82 preferably is copied to memory 64, which preferably comprises volatile random access memory ("RAM"), and is executed by CPU 62 from memory 64 in accordance with known techniques. The fabric manager 82 permits a network administrator to select and access one or more of the switches 52 in the fabric and to perform various administrative activities on the switches, as explained above.

In accordance with a preferred embodiment of the invention, once execution of the fabric manager 82 is initiated by an administrator, the administrator initially will be prompted to enter user verification information for the switches that the administrator desires to monitor and/or configure. Such user verification information may include, as noted above, a User ID and a Password. The User ID and Password information is stored in a buffer 65 created in volatile memory 64. With the administrator's verification information stored in volatile memory buffer 65, the fabric manager 82 uses the verification information stored in the buffer for each subsequent time the administrator desires to access the switches. Accordingly, the administrator need not repeat the process of entering his or her User ID and Password every time a switch is to be accessed for which corresponding user verification information has already been stored in memory buffer 65. It should be understood that this disclosure is not limited to the user verification information comprising just a User ID and a Password. In other embodiments, the verification information may comprise additional or different values by which the administrator can verify himself or herself to the console, such as biometric images (fingerprint images, retinal scans, etc.).

Figure 3:
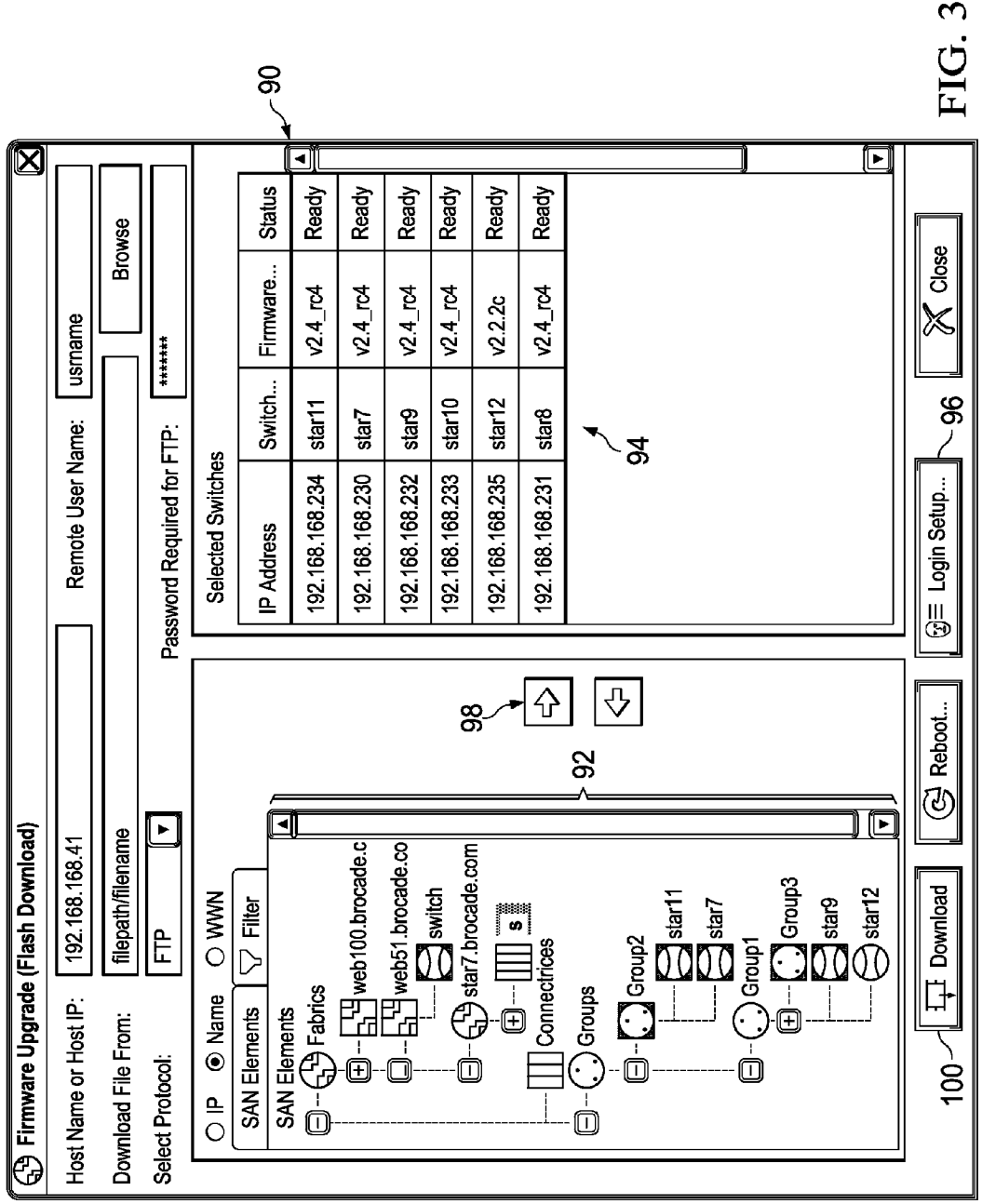
FIG. 3 shows a graphical user interface in which an administrator can select switches to perform administrative activities.
Figure 4:
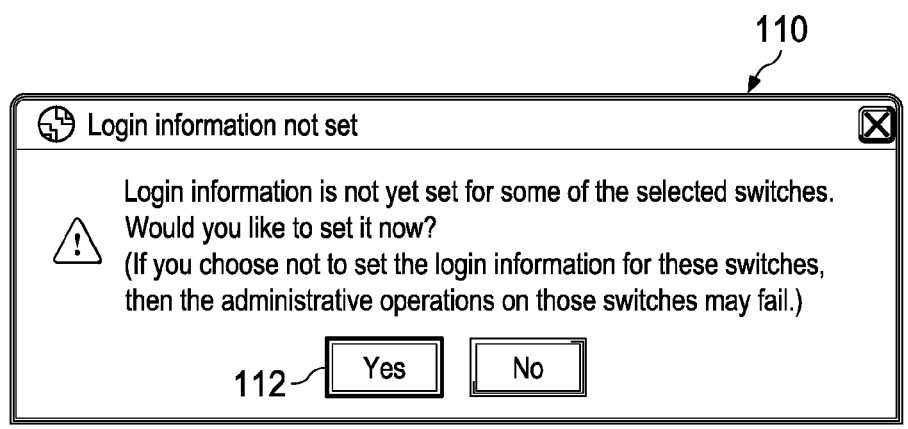
FIG. 4 shows a graphical user interface in which an administrator is prompted to enter login information for one or more of the selected switches.

FIGS. 3-6 show exemplary embodiments of graphical user interfaces that are implemented by fabric manager application 82. Referring now to FIG. 3, a graphical user interface ("GUI") 90 is shown which permits a network administrator to perform an administrative activity. The interface 90 shown in FIG. 3 is used to flash the ROM (not specifically shown) contained in one or more switches 52. The activity of flashing a switch's ROM is not critical to this disclosure, and is only exemplary of the general operation of the system. The fabric manager application 82 preferably includes other GUIs to permit the administrator to perform other administrative activities. Such other GUIs preferably function similar to GUI 90 in terms of the entry and storing of user verification information. Thus, ROM flashing GUI 90 has been selected to describe herein merely to exemplify the interaction between an administration activity GUI and the treatment of user verification information to expedite system management. In the left-hand browser window 92, the administrator can browse through and select the switches on which to perform the flashing operation. A desired switch can be selected by highlighting the desired switch and clicking the "ADD" arrow 98. In response, the selected switch is displayed in selection window 94. For each selected switch, selection window 94 preferably includes the switch's Internet Protocol ("IP") address, name, firmware version, and status, but other or different information can be shown as well.

The user verification information for a switch selected for an administrative activity preferably is entered only once during execution of the fabric manager application 82. The preferred embodiment provides several ways to initiate the process by which the administrator is prompted to enter user verification information. One way includes the administrator clicking the "Login Setup" button 96 at the bottom of the GUI 90. This preferably causes a "Login Setup" graphical user interface to be accessed, which will be discussed below with respect to FIG. 5. An alternative way to initiate user verification information entry is an automatic feature of the fabric manager application 82. When the administrator activates the GUI to begin the administrative activity, the console will automatically prompt the administrator to enter the user verification if such information has not already been entered for the switches selected. Referring to GUI 90, for example, the user clicks the "Download" button 100 to initiate ROM flashing of the selected switches. The fabric manager application 82 first will determine whether the administrator has previously entered user verification information for all of the switches 52 selected to have their ROMs flashed. If it is determined that the administrator has not logged on to one or more switches, the GUI 110 of FIG. 4 will be shown. This interface 110 informs the administrator that the login information is not yet set for one or more of the selected switches. The interface 110 further provides the administrator the opportunity to set the login information by clicking the "Yes" button 112. If the administrator selects the "Yes" button 112, the fabric manager application 82 will display the login setup graphical user interface 120 of FIG. 5. Further, the login setup GUI 120 can be entered directly without having to proceed through an administrative activity GUI. For example, GUI 120 can be selected from a menu of choices (not shown) in a main screen.

Figure 5:
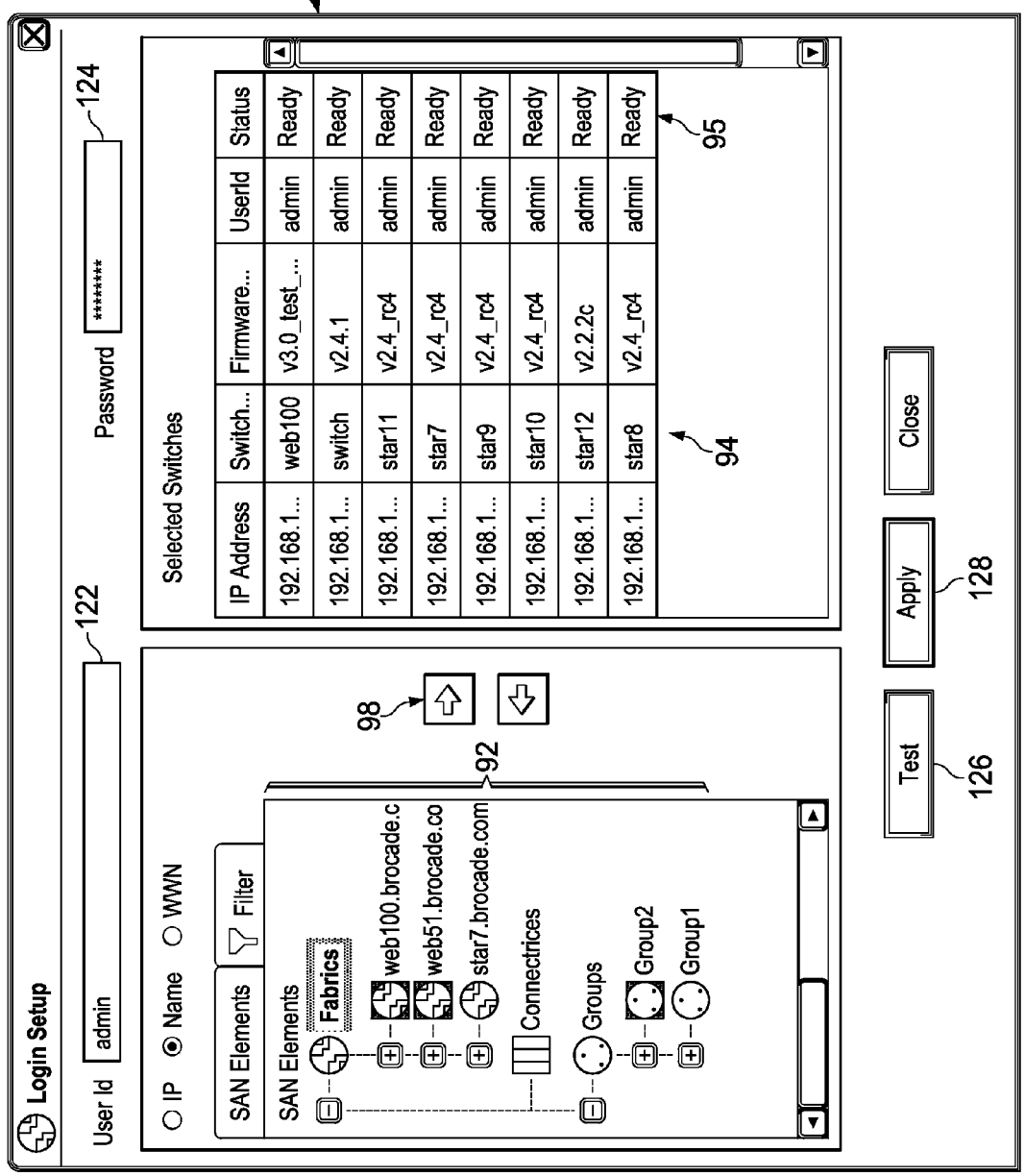
FIG. 5 shows a graphical user interface in which an administrator can enter a user ID and password for a group of selected switches to be saved on the administrator console for subsequent use.

Referring to FIG. 5, the login setup GUI 120, like the ROM flash GUI 90 of FIG. 3, includes a browser window 92 and a selection window 94 to which switches from the browser 92 can be added by clicking the ADD button 98. Of course, if switches have already been selected via the ROM flash, GUI 90, those selected switches may still be shown in selection window 94 of the login setup GUI 120. Further, additional switches may be added to selection window 94 from browser 92.

Before or after the administrator has selected the switches for which the login information is to be set up, the administrator enters the User Id and Password into text boxes 122 and 124, respectively. As noted above, these values comprise one embodiment of administrator verification information. Other embodiments of administrator verification information include biometric data corresponding to the administrator (e.g., fingerprint, retinal scan, etc.), encrypted values, etc. Biometric images can be captured via well known biometric sensors (not shown) coupled to the console 60 (e.g., the bridge and I/O unit 66). The User Id and Password preferably are used subsequently to access the selected switches. Once the User ID and Password are entered, the administrator may click the "Apply" button 128 at the bottom of GUI 120. Clicking this button causes the fabric manager application 82 to save the User Id and Password values to the memory buffer 65 (FIG. 2). Preferably, the User Id and Password are stored in the buffer 65, along with an identification of the associated switch(es) which the administrator selected. Then, each time one of those switches is selected for an administrative activity (e.g., ROM flash), the fabric manager application 82 preferably retrieves the User Id and Password from buffer 65, rather than forcing the administrator to re-enter such information. In accordance with the preferred embodiment, however, the administrative verification information buffer 65 is erased or otherwise invalidated when the administrator causes the fabric manager application 82 to cease execution. Accordingly, the administrative verification information stored in buffer 65 is in effect only for the current execution session of the fabric manager application 82 and the administrator will have to re-enter the User Id and Password each time he or she restarts the fabric manager application.

Referring still to FIG. 5, before, or after, saving the administrator verification information by clicking the "Apply" button 128, the administrator may test the accuracy of the verification information entered in text boxes 122 and 124. This can be accomplished by clicking the "Test" button 126 which causes fabric manager application 82 to log on to, or otherwise access, the selected switches using the User Id and Password. Alternatively, the "apply" and "test" functionality can be initiated by clicking a single button (for example, an "Apply" button).

Numerous switches can be selected, but only one password/user ID set can be entered in accordance with the preferred embodiment as described above. Presumably, the user will select those switches that all have common user verification information. If, however, one or more of the switches selected have differing user verification information, the user verification information entered by the user will be applied/tested for all selected switches. For those switches for which the user verification information does not work, an error message preferably is provided to the user signaling such a result. Referring to FIG. 5, each selected switch has an associated "status" field 95. The status "ready" indicates that the switch is ready to be tested for password access, while a status of "success" indicates that the user ID/password was successful. A status of "authorization failed" indicates that the user ID/password failed.

Figure 6:
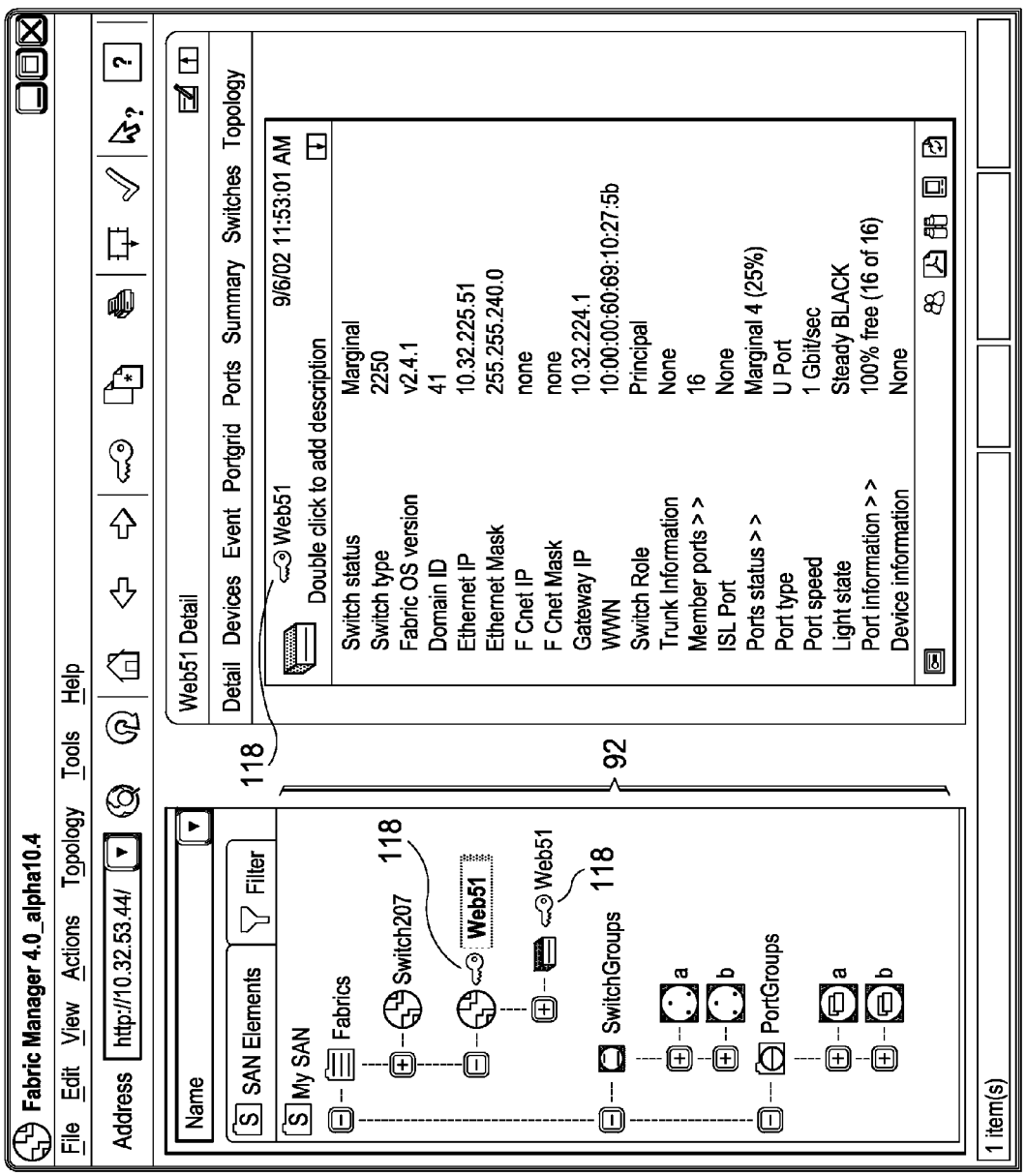
FIG. 6 shows an embodiment in which a graphical symbol is included for each switch for which a user ID and password have already been entered and verified.

Referring to FIG. 6, in accordance with another embodiment of the invention, once the administrator uses the login setup GUI 120 to save the administrator verification information for the selected switch(es), a key icon 118 preferably is displayed next to the switch name in the browser window 92 of any GUI which has a browser window or other windows such as next to switch "WEB 51." Of course, other graphical images besides a key can be used as well. The key icon 118 preferably signifies that administrator verification information has already been entered and saved in buffer 65 for the associated switch 52. Further, if administrative verification information for all the switches in a particular fabric has been entered, then a key icon can be displayed adjacent the fabric identifier indicating this situation.

The preferred embodiments discussed above thus permit a more efficient process for a network administrator or other user to manage the operation of a fabric of switches. Conveniently, the user need not repeatedly enter user verification information each time a switch is selected for performance of an administrative activity. Instead, the user verification information is entered preferably only one time and saved into volatile memory for subsequent retrieval and use therefrom.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   (a) receiving as an input a single selection of a group of switches selected for an administrative action to be performed on each switch;
   (b) retrieving user verification information automatically for each switch of the group of switches from a volatile memory buffer;
   (c) receiving as input a single user access request to perform the administrative action; and
   (d) performing the administrative action on each switch of the group of switches based on the single user access request.

2. The method of claim 1 wherein said user verification information includes a User Id and a Password.

3. The method of claim 1 wherein (a) includes providing for a button on a graphical user interface that when pressed causes said user verification information to be stored in the memory buffer for each switch in the group simultaneously.

4. The method of claim 1 further including displaying an icon on a display beside an identifier associated with one of the group of switches, said icon indicating that the user verification information has been stored in the memory buffer for the one of the group of switches.

5. The method of claim 1 further including testing the accuracy of the user verification information.

6. The method of claim 5 wherein said accuracy testing includes accessing said group of switches using said user verification information.

7. The method of claim 1 further comprising providing for an icon adjacent an identifier associated with the group of switches if each switch in the group has user verification information stored in the memory.

8. A system, comprising:
   a processor;
   memory coupled to said processor;
   wherein the processor:
   (a) receives a single selection of a group of switches selected for an administrative action to be performed on each switch;
   (b) retrieves user verification information automatically for each switch of the group of switches from the memory;
   (c) receives as input a single user access request to perform the administrative action; and
   (d) performs the administrative action on each switch of the group of switches based on the single user access request.

9. The system of claim 8 wherein said user verification information includes a User Id and a Password.

10. The system of claim 8 wherein the processor provides for a button on a graphical user interface that when pressed causes said user verification information to be stored in the memory for each switch in the group simultaneously.

11. The system of claim 8 wherein the processor provides for an icon beside an identifier associated with the group of switches, said icon indicating that the user verification information has been stored in the memory for the group of switches.

12. The system of claim 8 wherein the processor tests the accuracy of the user verification information.

13. The system of claim 12 wherein said accuracy testing includes accessing said group of switches using said user verification information.

14. A non-transitory machine-readable storage medium comprising instructions that, when executed by a processor, cause the processor:
   (a) receive a single selection of a group of switches selected for an administrative action to be performed on each switch;
   (b) retrieve user verification information automatically for each switch of the group of switches from a volatile memory buffer;
   (c) receive as input a single user access request to perform the administrative action; and
   (d) perform the administrative action on each switch of the group of switches based on the single user access request.

15. The machine-readable storage medium of claim 14 wherein said user verification information includes a User Id and a Password.

16. The machine-readable storage medium of claim 14 wherein (a) comprises providing for a button on a graphical user interface that when pressed causes said user verification information to be stored in the memory buffer for each switch in the group simultaneously.

17. The machine-readable storage medium of claim 14 further causing the processor to provide for an icon beside an identifier associated with one of the group of switches, said icon indicating that the user verification information has been stored in the memory buffer for the one of the group of switches.

18. The machine-readable storage medium of claim 14 further causing the processor to test the accuracy of the user verification information.

* * * * *